United States Patent Office 3,530,259
Patented Sept. 22, 1970

3,530,259
ELECTROLUMINESCENT DIODE AND SOUND RECORDING SYSTEM WITH CONTROLLED MAXIMUM LIGHT INTENSITY
Allan S. Miller, Wellesley, and Paul L. Vitkus, Bedford, Mass., assignors to Norton Research Corporation, Cambridge, Mass., a corporation of Massachusetts
Continuation-in-part of applications Ser. No. 532,121, Mar. 7, 1966, Ser. No. 556,408, June 9, 1966, Ser. No. 591,332, Nov. 1, 1966, Ser. No. 603,853, Dec. 22, 1966, Ser. No. 652,173, July 10, 1967, and Ser. No. 731,938, May 24, 1968. This application July 15, 1969, Ser. No. 841,950
Int. Cl. G11b 7/12; G01d 9/42; H05b 33/16
U.S. Cl. 179—100.3
9 Claims

ABSTRACT OF THE DISCLOSURE

An electroluminescent junction diode having sharply peaked light output is used, in a preferred form, in conjunction with a sound motion picture camera to record sound on motion picture film. The diode provides a transmission curve on a motion picture film which closely approximates an exponential model. The modulation of the light output is controlled so that the maximum intensity of sound signal to be recorded is below the upper knee of the exposure curve of the film.

SUMMARY OF THE INVENTION

The present invention relates to improved data recording systems that use modulated light images on photographic film.

The present invention will be particularly described in connection with a preferred embodiment which is a sound recording system.

This application is a continuation in part of copending applications Ser. No. 532,121, now abandoned, filed Mar. 7, 1966; Ser. No. 556,408, filed June 9, 1966; Ser. No. 591,332, filed Nov. 1, 1966; Ser. No. 603,853, filed Dec. 22, 1966; Ser. No. 652,173, now abandoned, filed July 10, 1967; and Ser. No. 731,938, filed May 24, 1968.

In the exposure of a photographic film to a light signal corresponding to a sound signal, it has been recognized as important that the resultant photographic image have the minimum possible width in the direction of film travel in order to record reasonably high frequency sound. Accordingly, in the past, emphasis has been placed on providing a highly collimated light from an extremely narrow light source or a carefully focused beam of light from a wider source. Such systems necessitate expensive mountings and make the camera quite delicate, thereby preventing its use under conditions of shock, vibration and the like.

The invention is particularly concerned with a sound recording system containing an electroluminescent junction diode as a source of light for producing a latent image on a photographic film. The diode is positioned near the surface of the photographic film (and preferably in contact with that surface) so that light coming out of one edge of the diode junction impinges directly on the film. The diode preferably has the property that, when a current pulse is passed through the diode to create a flash of light therefrom, the resulting exposed area on a stationary reversal photosensitive film will have an exposure profile (as measured by a microdensitometer) which can be approximated by an exponential function in the form of $$T = T_o \exp\left(-\frac{X}{L}\right)$$

where

T is the calculated transmission at any point on the profile;
$T_0$ is the maximum transmission of the film at a point opposite the junction of the diode, i.e., where $X=0$;
X is the distance measured perpendicular to the plane of the diode junction along the film from the point opposite the diode junction (X is always positive);
L is the characteristic width of half of the profile and equals X at $T = .37\ T_0$ (.37 being equal to $1/e$).

In the above equation, the symbols for exposure (E and $E_0$) could be used in place of T and $T_0$ since exposure is directly related to transmission as actually measured on a film, the specific relationship depending upon the shape of the exposure curves of the film, which may be reversal film or a combination of negative and positive films. While exposure is the more generic expression, transmission is usually measured and we therefore usually refer to transmission, particularly in the discussion of the experimental results plotted in the attached figures discussed below.

The sound transducing system of the preferred embodiment of the invention projects a sharply peaked image directly on the photographic film. The image of the diode employed in the invention, when recorded on a stationary film, appears under microscopic examination to have a broad base and a narrow peak. This is confirmed by microdensitometer transmission measurements. This sharp peak is sufficiently distinguishable from the remainder of the image when recorded on a moving film so that a relatively high frequency sound signal can be reproduced. In order to fully utilize the advantageous results achievable with this highly peaked light output, it is important that the diode bias current be so set and the modulation current be so adjusted, via the amplifier gain of the sound system, that, with the maximum sound input to be recorded, the maximum film transmission remains on the linear portion of the exposure transmission curve of the film. It is also much preferred that the degree of modulation be such that a substantial portion of the minimum light signal falls on the portion of the exposure curve which is upwardly concave so as to limit the amount of exposure of the film between the peak signals, thereby providing a higher signal-to-noise ratio at high frequencies. This gives a higher frequency response than is obtained if most of the high frequency exposure signal falls on the straight line portion of the exposure-transmission curve. Another way of expressing this aspect of the invention is to recognize that the light output of the diode has a peak whose intensity decreases as it spreads out on both sides of the point of maximum intensity. To decrease the effective $1/e$ width of the recorded image on the film, it is preferred that the portion of the light signal emitted by the diode which is spatially removed from the point of maximum signal intensity and which has an intensity less than ½ of the maximum intensity fall on the portion of the film exposure curve which is upwardly concave.

For a fuller understanding of the nature and objects of the invention, reference should be had to the following detailed discussion thereof taken in connection with the accompanying drawings in which.

DESCRIPTION OF PARTICULAR EMBODIMENT

Figure 1:
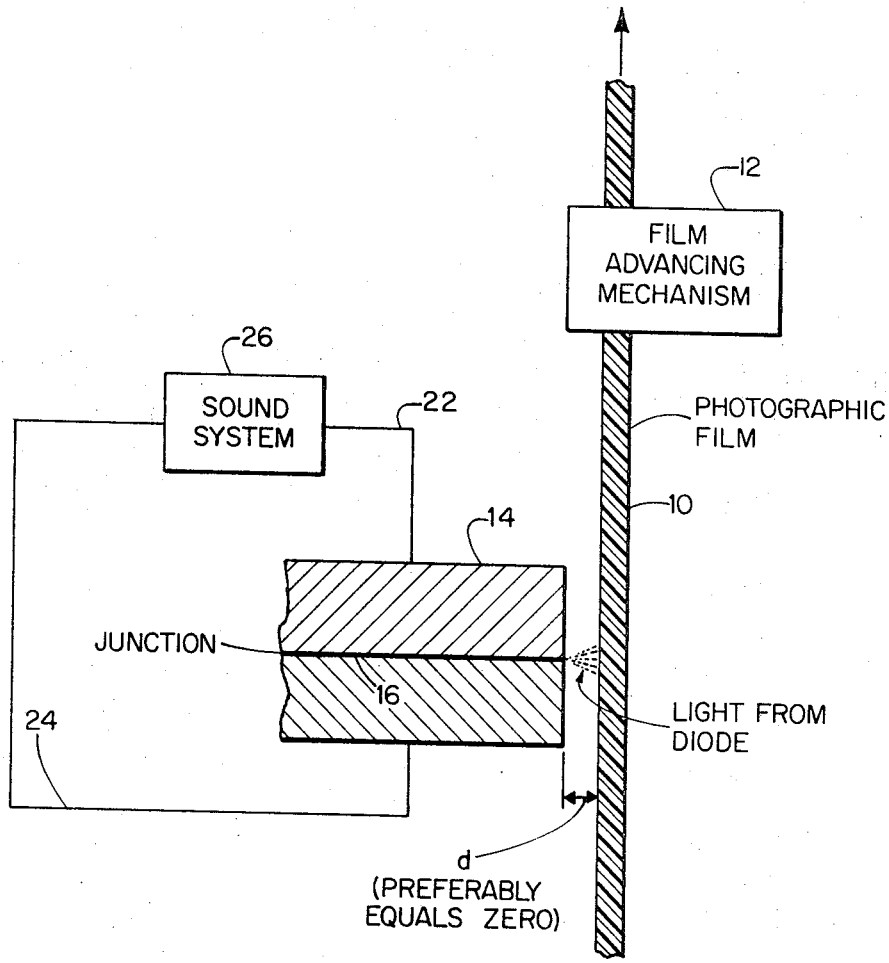
FIG. 1 is a diagrammatic, schematic representation of one preferred embodiment of the invention.

A sound recording system in accordance with the invention is indicated in the highly diagrammatic representation shown in FIG. 1. In this drawing the photographic film is indicated at 10, this film being suitably advanced at a constant speed by a film advancing mechanism schematically indicated at 12. Closely adjacent the film is positioned a junction diode shown generally at 14 and having a light-emitting junction at 16.

In one preferred embodiment of the invention, the junction diode 14 is silicon carbide and has a P layer on an n-type crystal, made as described in the copending application of Vitkus, Ser. No. 589,363, filed Oct. 25, 1966, now Pat. No. 3,462,321.

EXAMPLE

A diode prepared in accordance with the teachings of the above Vitkus application had an "n" section which was translucent green, and the p-n junction had a "p" regrown region about .0015″ thick. This "n" type crystal had an absorption coefficient of approximately 40 cm.$^{-1}$ for light of wavelength of 6000 A. The "p" type layer had an absorption coefficient of approximately 100–200 cm.$^{-1}$ of the same wavelength. When this diode was biased in the forward direction, it emitted strong yellow light having quantum efficiency of about $5 \times 10^{-6}$ in a narrow flat beam emanating from the junction.

The diode had the following physical characteristics:

Length (across film) 2.1 mm.
Width (parallel to $d$) 1.3 mm.
Thickness (normal to $d$ including contacts) .6 mm.

A 16 mm. sound camera was used to record sound on Plus X reversal film purchased from Eastman Kodak Company, the normal optical sound system of the camera having been replaced by the silicon carbide diode spaced .0005 inch from the surface of the film. When employing a linear amplifier, i.e., one having equal gain for all frequencies, the recorded sound had a useful upper frequency of approximately 5000 cycles per second. The speed of movement of the film past the diode in the recording camera was 7.2 inches per second. The bias current was 50 ma. (1.8 amps/cm.$^2$) with 100% modulation. Sound again was recorded using an amplifier having increased gain at the higher frequencies; the recorded sound had a useful upper frequency in excess of 6000 cycles per second. A suitable amplifier having such increased gain is described on pages 210–214 in "16 mm. Sound Motion Pictures" by William H. Offenhauser, Jr., Interscience Publishers Inc., N.Y. (fourth printing 1961).

A similar diode was used to record sound on 8 mm. Kodachrome IIA color film. With the diode being held in contact with the film surface, the film was advanced at 4 inches/second past the diode. The diode bias current was 10 ma. (1.1 amps/cm.$^2$) and the diode current modulation was about 100%. The maximum transmission corresponding to the sum of the bias current and the DC equivalent of the modulation (10 ma.), measured on a Kodak 1A densitometer (eye as sensing element), was 14.1%. When employing a linear amplifier, i.e., one having equal gain or amplification for all frequencies, the recorded sound had a useful upper frequency (i.e., down 20 db) of approximately 2050 cycles per second. The sound again was recorded using an amplifier having increased gain at the higher frequencies; the recorded sound had a useful upper frequency in excess of 3300 cycles per sound.

In the preceding example, the photographic film was developed using standard techniques normally employed at commercial photographic processing laboratories.

Figure 2:
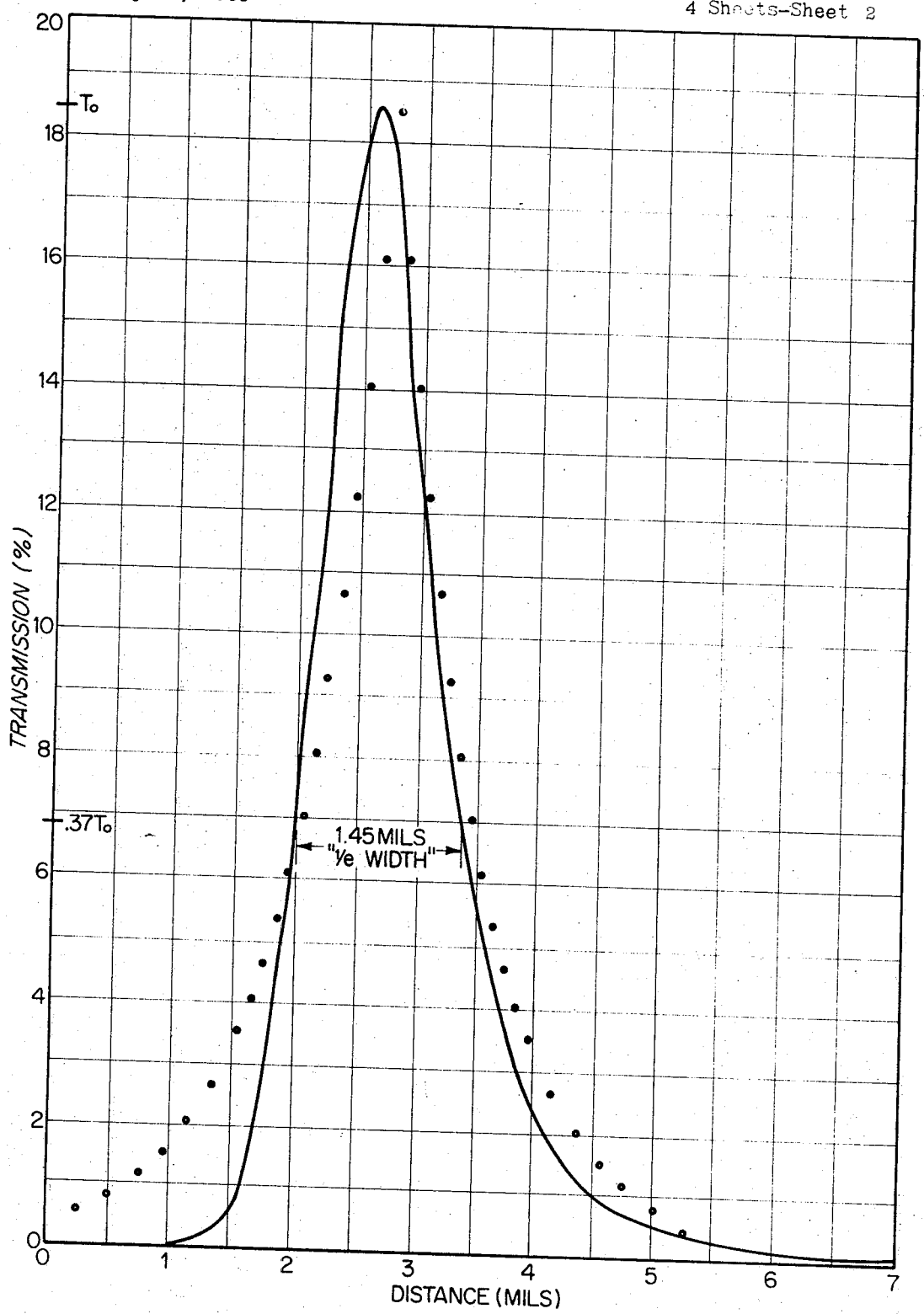
FIG. 2 is a plot of microdensitometer readings of an image pulse recorded on Kodachrome IIA color photographic film at a maximum transmission of 18.5%.

An approximate calculation of the distribution of light at the surface of the edge of the silicon carbide diode 14, assuming an exponential distribution, is indicated by the discrete points in FIG. 2. This light distribution is quite sharply peaked and the intensity decreases sharply at increasing distances measured in a direction normal to the junction. The characteristic width of one-half of the calculated curve of light distribution of FIG. 2 (which assumes an equal amount of light escapes from each side of the light-emitting plane) at the $1/e$ point (0.37%) has a value on the order of 1.45 mils. This mathematical model assumes transmission $T_0$ to be equal to 18.5%.

Also shown in FIG. 2 is a microdensitometer trace of transmission (exposure) vs. distance (in the direction in which the film would normally be moved) along the surface of an exposed Kodachrome IIA color film purchased from Eastman Kodak Company. This film was exposed, while stationary, to a similar electroluminescent silicon carbide junction diode, the edge of the diode being in contact with the film. The exposure was accomplished by passing 2 pulses of 50 ma. current and 200 microseconds duration through the diode. In FIG. 2, the actual microdensitometer readings were made using a slit width of 2 microns and are shown as the solid line.

As can be seen, the transmission (exposure) curve A is quite sharply peaked, much more so than would be expected from the exposure curve which would be obtained from an uncollimated and unfocused light source. The curve of FIG. 2 is similar to the data plotted in FIG. 2 of patent applications 591,332 and 603,853 mentioned above. In recording the data plotted in the instant application, the diode was held in contact with the film, while in the parent applications the same diode was held ½ mil from the film during exposure. This difference in spacing is not enough to explain the large difference in the width of the curve plotted in this application and the curves plotted in the above-mentioned two earlier parent applications. In view of the care employed in recording the data plotted in the instant application and the greater accuracy possible with the equipment used, it should be considered as the correct data.

The transmission curve in FIG. 2 also demonstrates the very useful narrowness of the upper portion of the curve as well as its broad base. The measured width of the curve at .37 $T_0$ ($1/e$ width) is only about .00145 inch, thus permitting recording of relatively high frequency sound with this diode.

In the above discussion, it was assumed that both halves of the diode crystal were equally transparent to light. However, in preferred diodes, one-half of the crystal is made essentially opaque to the emitted light. In such cases, where the light-emitting area is very close to the electrical junction, much of the light which would otherwise escape through the relatively opaque half of the diode is internally absorbed, and the emitted light has an asymmetric intensity distribution.

The same diode used to record the pulse image measured in FIG. 2 was also used to record a number of other pulse images at different light intensities. In each case the same individual pulse of 50 ma. current and 200 microseconds duration was employed. The number of pulses was varied to vary the total exposure. The developed pulse images were then measured with a D. W. Mann Company microdensitometer having a slit width of 2 microns and a slit length of 17 microns. In recording the data shown in the following table, there was used an interference filter having a window of 100 A. wide at 5770 A. This corresponds to the light distribution of about 5370 A. to 6460 A. with a peak at 5700 A. of the diode. In both cases the detector employed in the D. W. Mann microdensitometer was a photomultiplier with S-11 sensitivity.

TABLE I

| Peak percent Transmission | 1/e Width | Pulses |
| --- | --- | --- |
| 79.2 | 5.00 | 50 |
| 72.0 | 3.10 | 15 |
| 67.6 | 2.25 | 9 |
| 60.6 | 2.20 | 7 |
| 46.2 | 1.70 | 5 |
| 39.1 | 1.65 | 4 |
| 31.6 | 1.55 | 3 |
| 18.5 | 1.45 | 2 |
| 4.52 | 1.00 | 1 |

Figure 3:
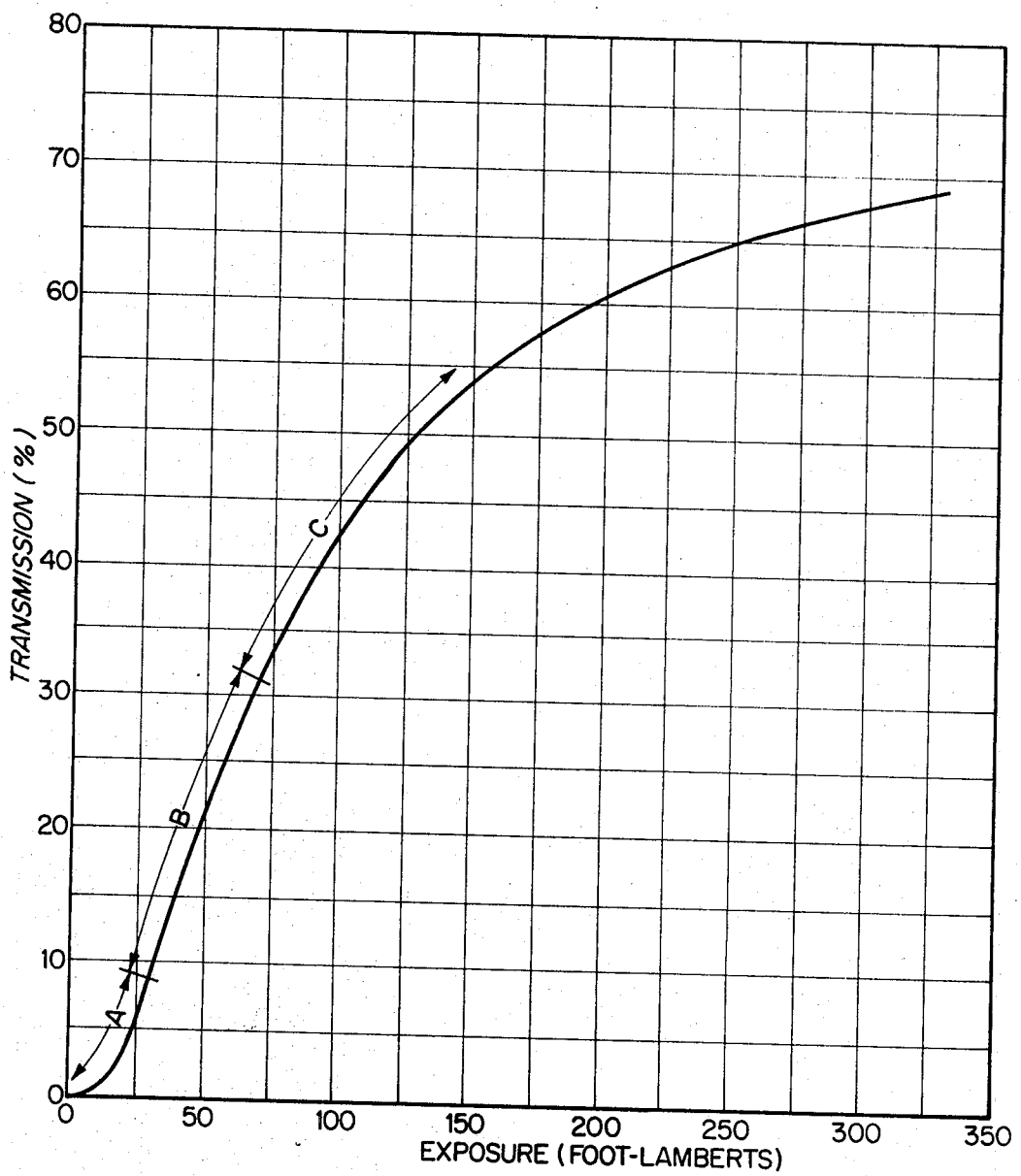
FIG. 3 is a plot of an exposure-transmission curve for yellow light recorded on Kodachrome IIA color photographic film.

The reason for a narrower 1/e width of pulse image with the lower peak transmission is believed to be due to the fact that the intensity of the light image which is spatially removed from the peak is of sufficiently low intensity, at low peak exposures, that this spatially removed light falls on the upwardly concave portion "A" of the exposure-transmission curve in FIG. 3. Utilizing the exposure-transmission curve of FIG. 3, we have transformed an exponential curve (having a recorded 1/e image width of 1.45 mils at 18.5% peak transmission) through the film characteristic for a number of transmission levels. The results of this transformation are set forth in Table II below:

Table II

| Peak percent Transmission: | Calculated recorded 1/e image-width |
| --- | --- |
| 5 | .795 |
| 10 | 1.040 |
| 18.5 | 1.45 |
| 20 | 1.637 |
| 30 | 2.013 |
| 35 | 2.338 |
| 40 | 2.502 |
| 50 | 2.923 |
| 60 | 3.764 |

As can be seen, the 10% peak transmission curve has a 1/e width of .00104 inch, while the 30% peak transmission curve has a 1/e width of .0020 inch. While the actual distribution of the light emitted from the diode does not have the exact shape used in calculating the data in Table II, the effect of the upwardly concave portion (A) of the exposure-transmission curve in reducing the 1/e width of the recorded image as compared to the image recorded with a peak exposure falling on a higher portion of the curve is clearly shown.

Thus, it is seen that the peak exposure should fall on the straight line portion (B) of the exposure-transmission curve, but the major amount of the lower intensity and spatially spread-out portion of the image should fall on the upwardly concave portion of the curve. This deemphasizes the transmission resulting from the lower intensity spread-out portion of the light signal. This means that the peak signals will be faithfully recorded while the transmission due to the lower intensity light between peak signals will be diminished; thereby increasing the signal-to-noise ratio, particularly at the higher frequencies where the light signals tend to overlap.

Figure 4:
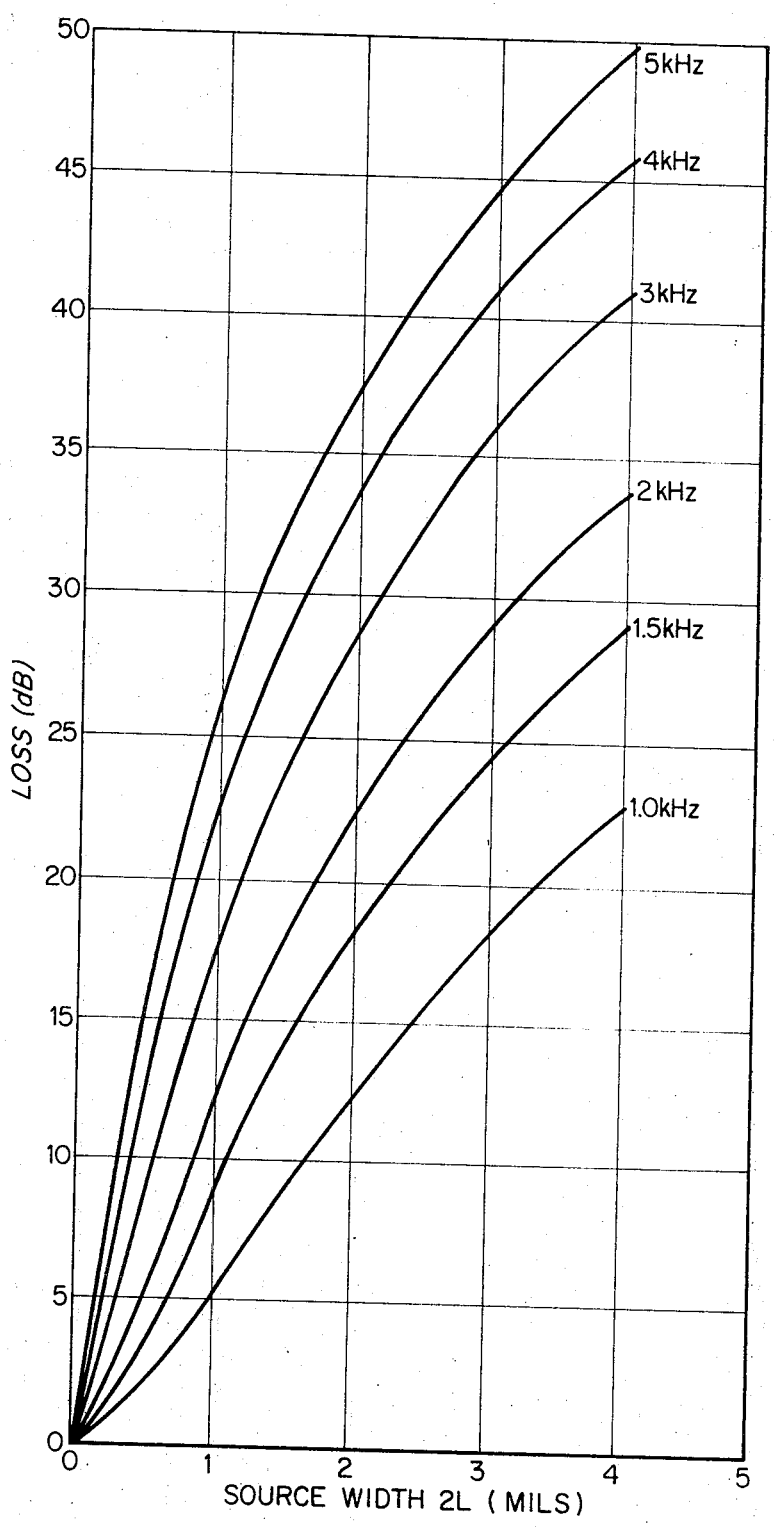
FIG. 4 is a plot of calculated signal loss versus exponential source width for various frequencies recorded on Super 8 photographic film, i.e., on film which moves past a readout slit at 4 inches per second.

The effect of widening of the pulse width on signal loss can be seen by reference to FIG. 4 wherein calculated db loss is plotted against the total characteristic 1/e width (2L) in mils. If a frequency response of 4,000 cycles per second is desired and if it is desired to have no more than about 30 db loss (without equalization), it will be seen that a total characteristic recorded 1/e width of less than 1.6 mils is required.

In considering 1/e width of a recorded pulse, it is necessary to take into account the fact that "image spread" in the film due to the emulsion will have a considerable bearing on the actual 1/e width obtained with a particular film and a particular light source. As a general proposition, there seems to be less "image spread" (on the order of .0002 inch) with black and white film as compared to a yellow signal recorded on color film, where the "image spread" appears to be as much as .0006 inch. With blue light, the "image spread" seems to be closer to .2 mil than to .6 mil. Thus, when we discuss 1/e width, care must be taken to distinguish between 1/e width of light at the surface of the diode and the 1/e width of the image recorded in the film by the light leaving the diode. While the exact contribution of the various factors to "image spread" cannot be exactly measured, it is believed to be a function (usually additive) of a number of effects, such as diffraction of the gelatin surface, reflection from silver halide grains and spread due to the distance from the film surface of the photosensitive layer which is exposed by the light impinging on the film.

It is extremely difficult to measure the exact shape of the light distribution emitted at the surface of the diode. However, measurements taken by moving a knife edge across the diode in very close proximity give a light distribution curve approximating an exponential curve and having a 1/e width on the order of 2.2 mils. Since the "image spread" of the film is about .6 mil, this results in a calculated "exposure" image of about 2.8 mils. When this 2.8 mil "exposure" curve is transformed through the transmission exposure curve of the film of FIG. 2, it gives a "recorded" 1/e width (at 18.5% T) of about 1.45, which is the same as the 1.45 mils actually measured in FIG. 2. While this precise agreement does not apply for all levels of percent transmission, the same general trend does exist in both the theoretical and actual curves.

Another factor to be considered in analyzing the interaction of the film characteristic and the peaked light output of the diode is the effect of the slope of the exposure transmission curve (FIG. 3) upon the amplitude of the signal (i.e. change in transmission) which is recorded on the film. Where the slope of the FIG. 3 curve is greatest (between about 5% and 15% transmission) a given percentage change in brightness of diode light output will provide the largest percentage change in transmission. It is also true that, as the frequency of sound increases, the change in signal brightness will decrease due to increasing overlap of the pulsating light images (corresponding to the sound signal) which sequentially fall on the film. Accordingly, at the higher frequencies to be recorded, the maximum percentage change in film exposure will be progressively reduced. At a frequency of about 2000 Hz. for example, the maximum percentage change in film exposure obtainable with a diode of the present invention will be on the order of 10% of the median exposure. To obtain the maximum percentage change of transmission from this rather small percentage change in exposure, it is accordingly desired to operate so that the median exposure falls on that portion of the exposure transmission curve having the steepest slope. This happens to be between about 5 and 15% transmission and, accordingly, also reinforces the benefit to be obtained by operating with the maximum signal on the B portion of the FIG. 3 curve.

In connection with the preferred silicon carbide, it should be pointed out that this material has the advantage that it can be highly polished to provide an optically smooth face from which the light is emitted. Since silicon carbide is an extremely hard material, the diode face is not easily abraded or scratched during handling and use. The abrasion-resistant quailty of silicon carbide is an advantage because it allows the diode to retain a clear unfaceted face necessary for undistorted transmission of light.

Since certain changes can be made in the above apparatus without departing from the scope of the invention herein involved, it is intended that all matter contained in the above description shall be interpreted as illustrative and not in a limiting sense.

What is claimed is:

1. A system for recording data such as sound comprising a photographic film, means for creating relative movement between said film and a light source at a constant speed, said light source comprising an electroluminescent junction diode, the plane of the junction being generally perpendicular to the direction of relative movement of the film, one edge of the junction being adjacent the surface of the film, said diode emitting light in the portion of the spectrum to which the photographic film is sensitive, the light emitted from the diode having an intensity distribution, as measured in the direction of relative movement of the film, which comes to a sharp peak adajcent the junction and tapers off on both sides of the peak in a generally exponential fashion, and an amplifier means for passing current through said electroluminescent junction diode, said amplifier means limiting the maximum light intensity emitted from the diode adjacent the plane of the junction corresponding to the maximum intensity of data signal to be a value below the upper knee of the exposure curve of the film, whereby the image recorded by the film will reproduce the narrow peaked light signal striking the film without substantially increasing the width of the peak at a point near the peak (other than increase due to relative movement of the film) and a relatively high density of data per unit area of film may be recorded in said system.

2. The system of claim 1 wherein said diode is formed of silicon carbide.

3. A sound recording system comprising a photographic film, means for creating relative movement between said film and a light source at a constant speed, said light source comprising an electroluminescent junction diode, the plane of the junction being generally perpendicular to the direction of relative movement of the film, one edge of the junction being adjacent the surface of the film, said diode emitting light in the portion of the spectrum to which the photographic film is sensitive, the light emitted from the diode having an intensity distribution, as measured in the direction of relative movement of the film, which comes to a sharp peak adjacent the junction and tapers off on both sides of the peak in a generally exponential fashion, and an amplifier means for passing current through said electroluminescent junction diode, said amplifier means limiting the maximum light intensity emitted from the diode adjacent the plane of the junction to a value below the upper knee of the exposure curve of the film, whereby the image recorded by the film will reproduce the narrow peaked light signal striking the film without substantially increasing the width of the peak at a point near the peak (other than increase due to relative movement of the film) and relatively high frequency sound may be recorded in said system.

4. A system for recording sound on a photographic film comprising means for creating relative motion between said photographic film and at light source at a constant speed, said film having an exposure-transmission curve which is upwardly concave at low exposure, linear for intermediate exposure and downwardly concave for maximum exposure, said light source comprising an electroluminescent junction diode, the plane of the junction being generally perpendicular to the direction of relative motion, one edge of the diode being positioned less than .001 inch from the surface of the film, the junction diode comprising a base crystal containing one type of impurity, a layer on said crystal containing a second type impurity to form a p-n junction diode, said diode emitting light in the portion of the spectrum to which the photogarphic film is sensitive, said diode emitting light from said edge over an area which is at least .001 inch wide (as measured in the direction of relative motion), the light striking the film at any instant of time having an image coming to a peak whose intensity decreases as it spreads out on both sides of the point of maximum intensity, and means for modulating current fed to the diode in accordance with a sound signal to be recorded on the film, said modulating means limiting the current to the diode in relation to the film characteristics so that the maximum exposure, corresponding to the maximum signal to be recorded at the higher frequencies, falls on the straight line portion of the exposure-transmission curve of the film and the degree of modulation being such that a substantial portion of the spread-out light signal falls on the portion of the exposure-transmission curve which is upwardly concave so as to limit the amount of exposure of the film between the peak intensity signals.

5. The system of claim 4 wherein the median intensity of the light signal falls on the portion of the exposure-transmission curve having about the maximum slope.

6. A sound recording system comprising means for moving a photographic film past a light source at a constant speed, said light source comprising an electroluminescent junction diode, the plane of the junction being generally perpendicular to the direction of travel of the film, one edge of the diode being positioned less than .001 inch from the surface of the film, the junction diode comprising a base crystal containing a relatively high concentration of one type of impurity, a layer on said crystal containing a second type impurity to form a p-n junction diode, said diode emitting light in a portion of the spectrum to which the photographic film is sensitive, said diode emitting light from said edge over an area which is at least .001 inch wide (as measured in the direction of film travel), a sound pick up means to convert sound into an electrical signal, an amplifier means for said electrical signal, said amplifier means providing increasing gain for increasing sound frequency said amplifier means limiting the light intensity emitted from the diode adjacent the junction to a value below the upper knee of the exposure curve of the film so that the light striking the film at any instant of time produces an image coming to a peak which is less than about .0015 inch in width at a point corresponding to 80% of the maximum intensity.

7. A sound recording system comprising means for moving a photographic film past a light source at a constant speed said light source comprising an electroluminescent junction diode, the plane of the junction being generally perpendicular to the direction of travel of the film, one edge of the diode being positioned less than .001 inch from the surface of the film, the junction diode comprising a base crystal containing one type of impurity, a layer on said crystal containing a second type impurity to form a p-n junction diode, said diode emitting light in a portion of the spectrum to which the photographic film is sensitive, said diode emitting light from sad edge over an area which is at least .001 inch wide (as measured in the direction of film travel), the light striking the film at any instant of time having an intensity distribution (as measured in the direction of film travel) whch has a sharp peak and which decreases as it spreads out on both sides of the point of maximum intensity, said light distribution being less than .0025 inch in width at a point corresponding to 37% of the maximum intensity, and means for modulating current fed to the diode in accordance with a sound signal to be recorded on the film, the spacing between the diode and film being sufficiently small and the maximum intensity of light corresponding to the maximum sound level at high frequencies being sufficiently limited by the modulating means in relation to the film charactersitcs so that the intensity distribution which would be recorded on a stationary film would have a width less than .0015 inch at a point corresponding to 37% of the maximum intensity.

8. The system of claim 7 wherein the modulating means includes an amplifier having an increased gain at higher frequencies.

9. The system of claim 7 wherein one side of the p-n junction has a higher absorption for emitted light than the other side so that the peaked light output is asymmetric.

References Cited

UNITED STATES PATENTS 2,776,367   1/1957   Lehovec.

BERNARD KONICK, Primary Examiner

R. F. CARDILLO, JR., Assistant Examiner

U.S. Cl. X.R.

313—108; 317—234; 346—107